United States Patent
Haas et al.

(10) Patent No.: US 7,105,953 B2
(45) Date of Patent: Sep. 12, 2006

(54) POWER SHARING SYSTEM AND METHOD FOR BATTERY OPERATED CONTROLLER AND APPLICATION MODULES

(75) Inventors: William Robert Haas, Fort Collins, CO (US); Kirk Steven Tecu, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 414 days.

(21) Appl. No.: 10/421,298

(22) Filed: Apr. 22, 2003

(65) Prior Publication Data

US 2004/0212941 A1 Oct. 28, 2004

(51) Int. Cl.
*H01H 3/26* (2006.01)
(52) U.S. Cl. .................................... 307/140
(58) Field of Classification Search ................ 307/140
See application file for complete search history.

(56) References Cited

U.S. PATENT DOCUMENTS

| | | | |
|---|---|---|---|
| 6,304,978 B1 * | 10/2001 | Horigan et al. ............. | 713/322 |
| 6,463,545 B1 * | 10/2002 | Fisher et al. ............... | 713/340 |
| 6,546,495 B1 * | 4/2003 | Shimura et al. ............ | 713/300 |
| 6,760,852 B1 * | 7/2004 | Gulick ....................... | 713/324 |
| 2001/0030526 A1 * | 10/2001 | Bohne ........................ | 320/150 |
| 2002/0175655 A1 * | 11/2002 | Huykman et al. .......... | 320/116 |

FOREIGN PATENT DOCUMENTS

WO WO94/10718 5/1994

OTHER PUBLICATIONS

Low Battery Monitor Delays System Shutdown, Dallas Maxim, Jul. 9, 1998, pp. 1-2, http://www.maxim-ic.com.
ON Semiconductor Unveils Power Management IC, Eelectronic Component News, Nov. 11, 2000, pp. 1-2, www.onsemi.com.

* cited by examiner

*Primary Examiner*—Robert L. DeBeradinis

(57) ABSTRACT

A power-sharing controller module comprises a processor, power manager, and at least one connector for detachably electrically connecting an application module to the controller module. The power manager is operable to manage power from a battery to the application module through said connector and to monitor the voltage of the battery. The processor is programmed to send a power reduction command to the application module in response to the monitored battery voltage moving outside of a permissible range.

A power sharing method comprises supplying power from the battery in the controller module to the application module detachably connected to the controller module. Power supplied to the application module is reduced in response to an adverse power indication to conserve power for the controller module.

36 Claims, 5 Drawing Sheets

POWER SHARING SYSTEM AND METHOD FOR BATTERY OPERATED CONTROLLER AND APPLICATION MODULES

BACKGROUND OF THE INVENTION

1. Field of the Invention

This invention relates to electronic systems, and more particularly to power sharing methods and systems.

2. Description of the Related Art

Electronic devices which capture, create, store, manipulate and/or transfer digital music, sound, images, movies or other encoded data have become more prevalent with the advent of less-expensive semiconductor processing and increased consumer demand. Applications such as portable MP3 (Moving Picture Experts Group layer 3 standard) players, PDAs (electronic personal data assistants), digital cameras and digital voice recorders continue to gain popularity. The general trend for each of these electronic applications is toward miniaturization and improved battery management.

These are several products with advanced battery management. One such product provides for an early warning to critical systems when the power-supply voltage for the system begins to fail. The warning enables the system microprocessor to perform essential tasks before a hard reset must be issued to turn off the system due to low supply voltage. The company also advises that system shutdown may be accomplished using a single threshold voltage detector in combination with a delay timer for the reset signal to ensure that the system voltage supply remains valid long enough to complete the system shutdown routine. (See Maxim Integrated Products, Inc., *Low Battery Monitor Delays System Shutdown*, P. 1 (Jul. 9, 1998))

Another solution can be found in the MC33351A power management IC (integrated circuit) offered by ON Semiconductor Corporation (with headquarters in Phoenix, Ariz.). This IC features a programmable current level for individual battery cells and two P-channel MOSFET (metal oxide silicon field effect transistor) switches to interrupt the appropriate discharge path FET (field effect transistor) in the event a parameter is exceeded. (See *On Semiconductor Unveils Power Management IC*, Electronic Component News, ¶4–5 (Nov. 15, 2000)) The IC also provides for a shutdown delay once a threshold is exceeded for a discharge current limit (Id. at ¶5). Similar to the previously described solution, the IC is designed for laptop and other single microprocessor applications.

SUMMARY OF THE INVENTION

A system and method are described that protect a controller module from excessive battery discharge by an application module. In this context, a need still exists for a power management system and method for a multiprocessor system. In one embodiment of the invention, power is supplied from a battery in the controller module to a detachably connected application module, and the power supplied to the application module is reduced in response to an adverse power indication to conserve power for the controller module.

An embodiment of a power sharing controller module includes a processor, power manager and at least one connector for detachably electrically connecting an application module to the controller module. The power manager is operable to provide power from a battery to the attached application module through the connector and to monitor the voltage of the battery. The processor is programmed to send a power reduction command to the application module in response to the monitored battery voltage moving outside of a permissible range.

BRIEF DESCRIPTION OF THE DRAWINGS

The components in the figures are not necessarily to scale, emphasis instead being placed upon illustrating the principals of the invention. Moreover, in the figures, like reference numerals designate-corresponding parts throughout the different views.

DETAILED DESCRIPTION OF THE INVENTION

A portable modular system with detachably connectable controller, memory and application modules, has been proposed by the present inventors. This system is the subject of application Ser. No. 10/307,034, filed Nov. 27, 2002, "Portable Modular Electronic System". An improved battery management scheme for such a system is particularly important, since the battery may be drained at a location where a replacement battery is not available.

Figure 1:
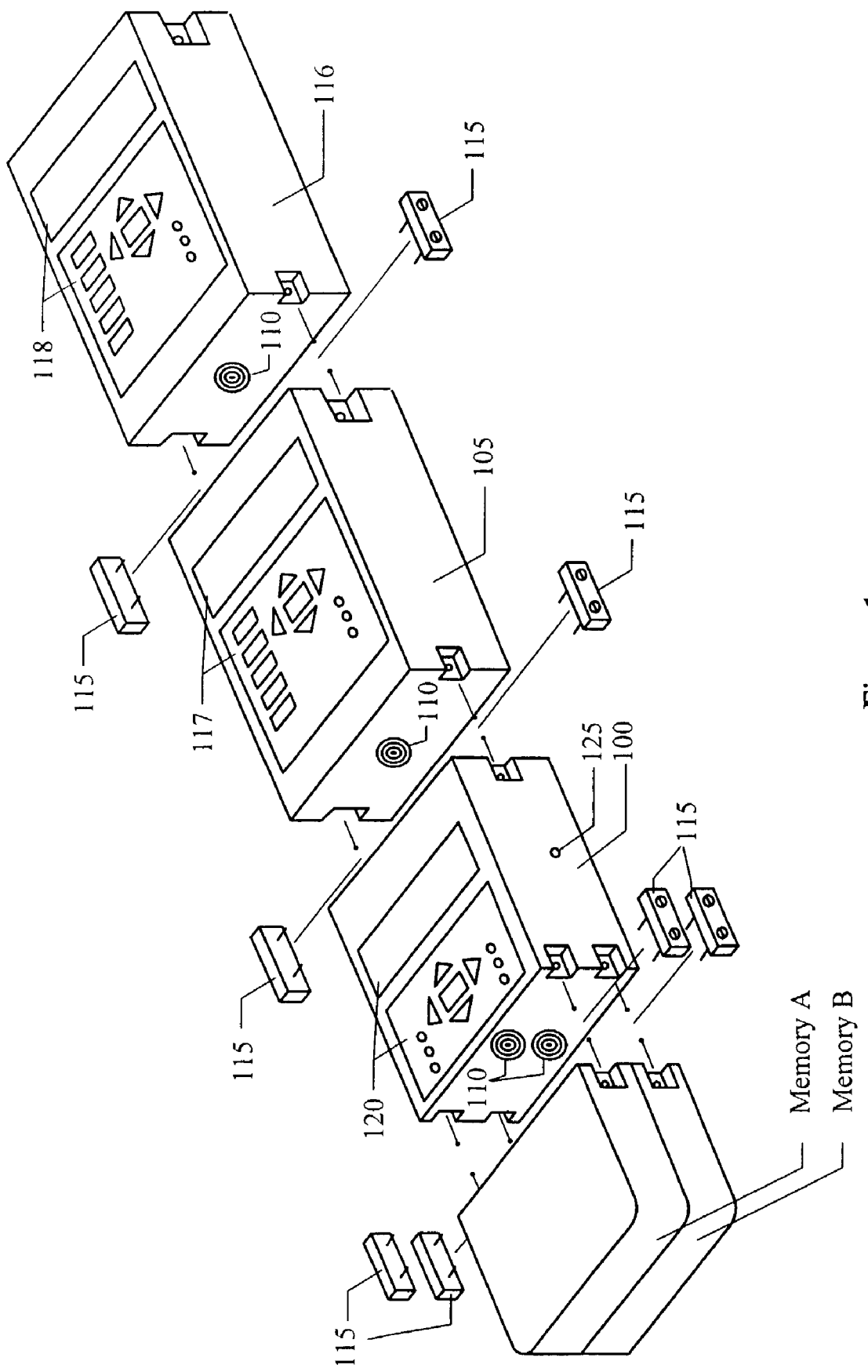
FIG. 1 is an exploded perspective view illustrating an embodiment of a portable modular electronic device in which embodiments of the invention may be used to advantage.

In FIG. 1, a controller module 100 is aligned for electrical connection to an application module 105 through an electrical connector 110 in the application module 105 and a complementary, opposed connector (not shown) in the controller module 100, and for mechanical connection to the application module by connectors 115. The controller module manages power sharing between itself, application module 105 and a pair of memories A, B that are also modular. Memories A, B are both electrically and mechanically connectable to the controller module.

The application module 105 may be any portable electronic consumer application such as a video/still image player or reviewer, a PDA, a digital still or video camera, or an MP3 player. It can also be connected in turn to additional application modules 116 through electrical and mechanical connectors 110, 115 similar to those used to connect the controller module to the memories and first application module. With the second application module connected, the controller module 100 provides power to it through an opposing electrical connector (not visible) on the first application module 105. Application user interfaces 117, 118 are also provided on application modules 105 and 116, respectively, to provide application-specific information to a user.

The illustrated electrical connector 110 has four concentric electrical contacts, providing two data paths and two power paths between the modules (100, 105). Many different electrical and mechanical connection schemes can instead be employed. In the embodiment of FIG. 1, the connectors for adjacent modules are unisex in nature and spring-biased to extent slightly outward from their respective modules, providing a secure electrical contact when brought in to contact with each other and held in place with the mechanical connectors 115. A user interface 120 on the controller module provides information to, and accepts alphanumeric text or other input from, a user. An AC (alternating current) input port 125 is also provided to facilitate power input for battery charging and battery-less operation.

Memories A and B are shown aligned for electrical connection to the controller module 100 through respective electrical connectors 110 in the controller module, and a complementary pair of electrical connectors (not shown) in the memories, one for each memory. Each memory can be individually replaced if it goes bad, and a new memory installed.

Figure 2:
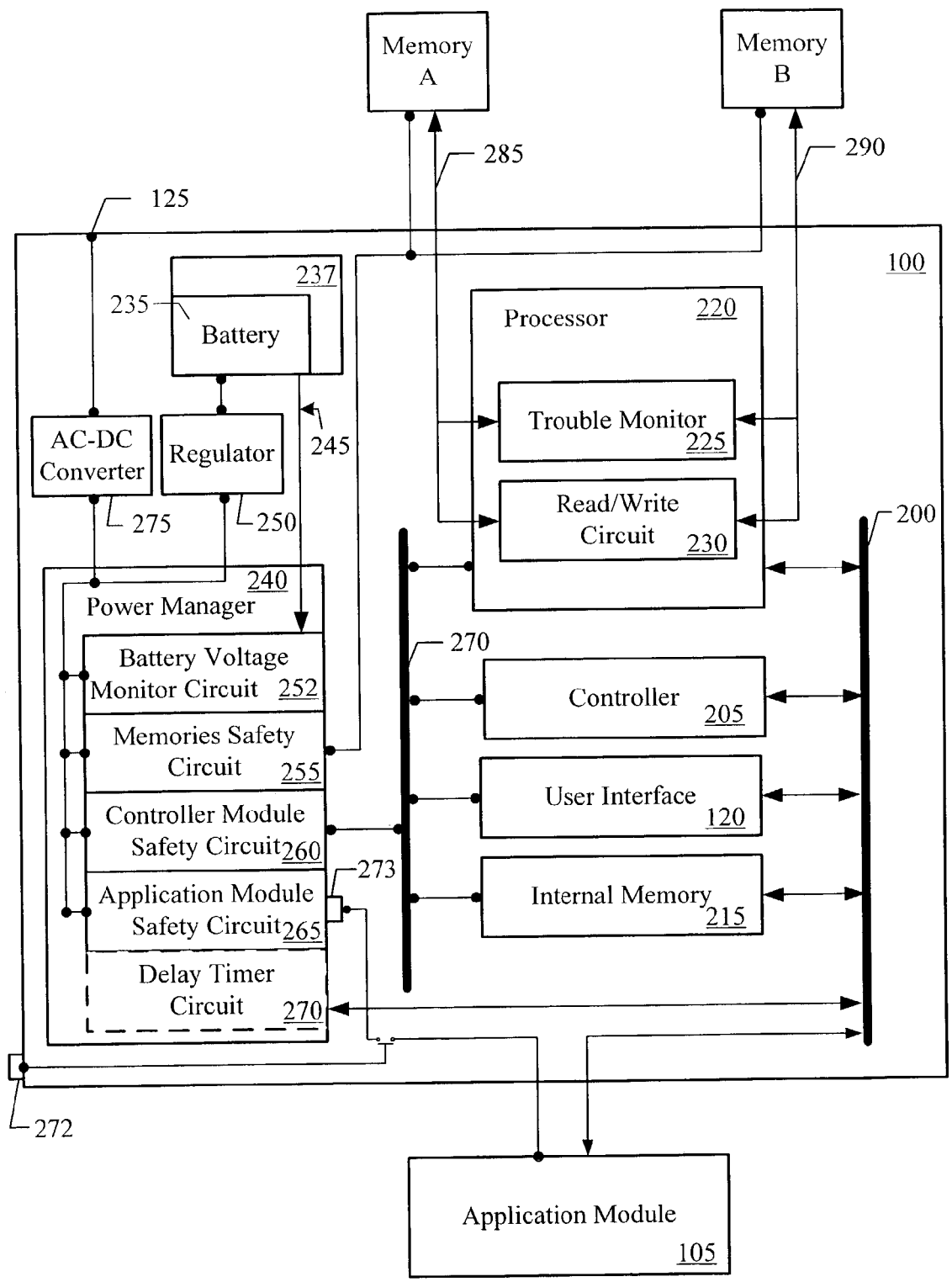
FIG. 2 is a block diagram of one embodiment of the invention illustrating a controller module having a processor and power manager, the processor in communication with an application module and memories A and B.

FIG. 2 illustrates an implementation of a controller module 100 that enables it to manage power sharing between itself, the application module 105 and the memories A and B. In the figure, power connections are indicated by dots and data inputs by arrows. The controller module includes a data bus 200 in communication with a controller 205, a user interface 120, an internal memory 215, and a processor 220. The processor 220 and controller 205 may be integrated into a single chip. Similarly, the internal memory 215 may be integrated onto a single chip with either the processor 220 or controller 205, or both.

The processor 220 is programmed to provide several functions, including a trouble monitor 225 and a read/write circuit 230. The trouble monitor 225 detects whether memories connected to the processor 220 are operating correctly, and notifies the user of adverse power indications or other user problems through the user interface 120. The read/write circuit 230 communicates with the application module 105, and governs the read/write of data to and from memories A and B. Elements 225 and 230 may be implemented in firmware, or with a software controlled general purpose DSP (digital signal processor). The data bus 200 is illustrated with electrically conductive paths between the processor 220, controller 205, user interface 120, and internal memory 215. Other signal transport mechanisms, such as an optical bus, may also be used.

The modular system described thus far is only one in which embodiments of the invention may be used to advantage. Many variations can be made to the implementations of the modules within the scope of the invention.

The controller module 100 also includes a battery compartment 237 which is supplied with a battery 235, either by the user or by the original manufacturer or dealer. The compartment can be any suitable structure that keeps the battery connected to a pair of battery terminals, and does not have to be a housing or enclosure. The battery supplies power to a power manager 240 through a voltage regulator 250 that steps down the battery voltage to a regulated level for the system. An output 245 from the battery compartment 237 enables the power manager 240 to directly monitor the battery's voltage $V_B$. Alternatively, the output of regulator 250 can be monitored for an indication of the battery voltage $V_B$.

The power manager includes a battery voltage monitor circuit 252 that is preferably connected to both the battery output 245 and voltage regulator 250 for monitoring their voltages, although it can alternately be connected to only one or the other. It also includes memory, controller module, and application module safety circuits 255, 260 and 265, respectively, in series with the voltage regulator 250 to terminate the supply of power to memories A and B, the remainder of the controller module 100, and the application module 105, respectively, in response to excessive current, power, or voltage drawn by these components. A delay timer circuit 270 may also be included in the power manager 240 to provide an optional time delay prior to terminating power supply in response to a low battery voltage indication from the battery voltage monitor circuit 252.

The power manager 240 transmits power at the regulated voltage level from the voltage regulator 250 to memories A and B, the application module 105 and the controller module 100. A switch 272 is in series with the power manager 240 and application module 105 to provide power to the application module 105 when engaged by the user. A power bus 270 distributes power from the power manager 240 to the processor 22b, controller 205, user interface 120, and internal memory 215. The controller module safety circuit 260 is also connected between the regulator 250 and the power bus 270 to protect the controller module 100 from excessive current. The safety circuits (255, 260, 265) reduce or terminate the supply of power to their respective protected circuits, and are preferably implemented as fuses or breakers that trigger at predetermined fault current levels. The application module safety circuit 265 also includes a switch (not shown) that opens or closes in response to a signal from the processor 220.

Instead of providing a common supply voltage, the power manager 240 can be configured to provide different respective voltage levels to the application module 105, processor 220, memories A and B, and the remainder of the controller module 100. The power bus 270 would then be split into separate power busses for the processor 220, controller 205, user interface 120, and internal memory 215 components as appropriate.

The battery 235 has a rated voltage that is normally greater than the output voltage of the voltage regulator 250. The processor 220 communicates with the application module 105 through the data bus 200 to shut down the application module 105 when an adverse power indication is received by the processor indicating a battery voltage $V_B$ that is less than a predetermined voltage level below the rated battery voltage. Preferably, the processor 220 transmits a shutoff command to the application module 105. Or, it can simply cut off power to the application module 105 by operating a switch 273 in the application module safety circuit 260.

The internal memory 215 buffers files received from the application module 105 to enable efficient reads and writes by the read/write circuit 230 from and to memories A and B, through data paths 285 and 290, respectively. An AC-DC Converter 275 is connected between the AC input port 125 and the power manager 240 to enable direct connection to a conventional AC voltage source.

Figure 3:
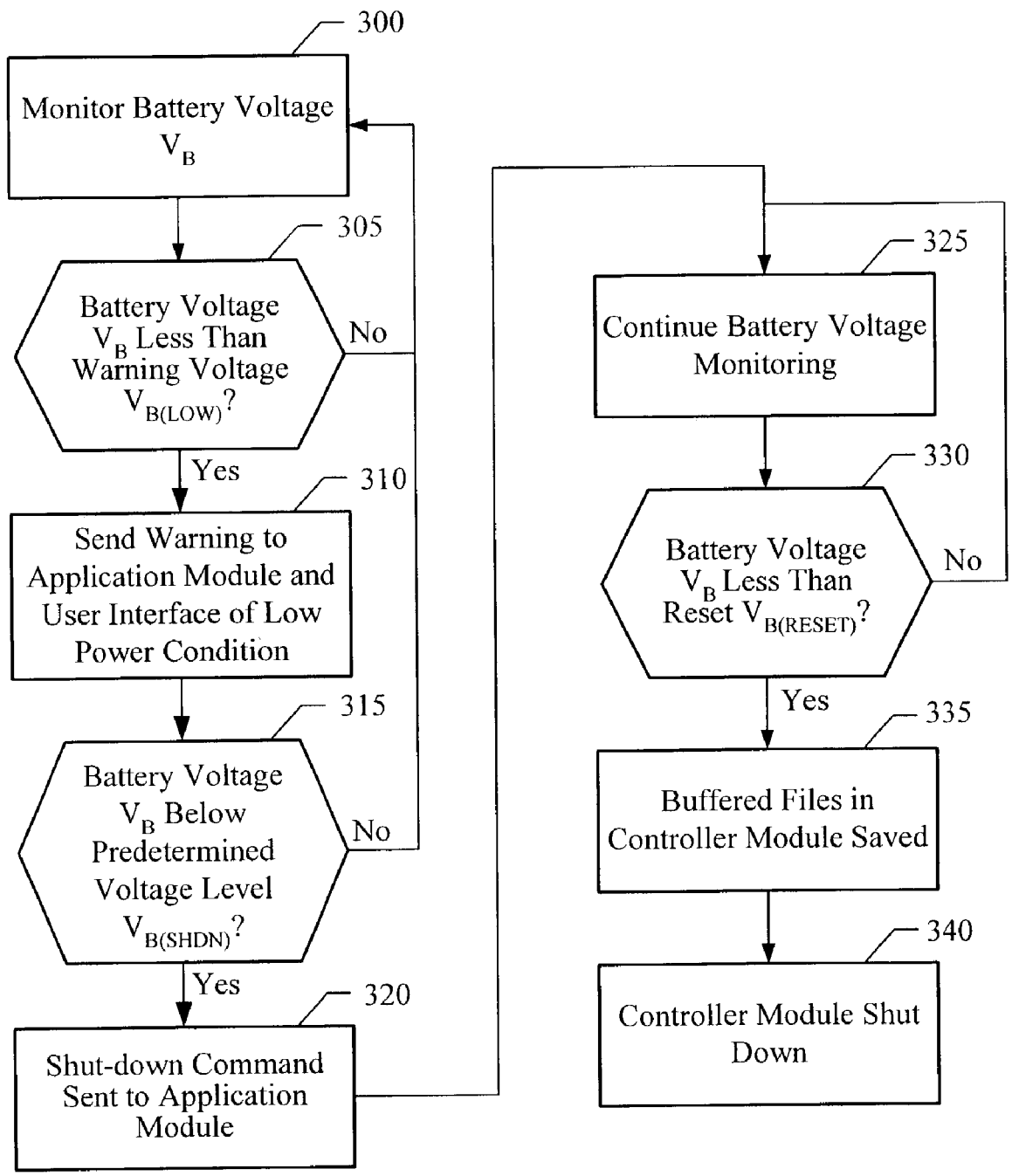
FIG. 3 is a flow diagram of an embodiment of the invention able to send an immediate shutdown command to an application module in response to an adverse power indication.

In an embodiment illustrated by the flow diagram of FIG. 3, a warning is provided to a user in response to the battery (or regulated) voltage falling below a first threshold level. The warning is provided when the monitored voltage falls below a second threshold level prior to shutdown of the application modules. The battery voltage $V_B$ is monitored either at the battery output 245, or from the output of the voltage regulator 250, for an adverse power indication in the form of a predefined low battery voltage level (block 300). When the battery voltage $V_B$ is less than the warning voltage $V_{B(Low)}$ (block 305), a warning is sent to the user interface 120 to notify a user of the low voltage condition (block 310). This gives a user an opportunity to conclude use of the application module 105 prior to its shutdown. A warning may also be sent to the application module 105 to enable it to optionally begin pre-shutdown housekeeping activities, and to optionally display a warning in its application user interface 117. If the battery voltage $V_B$ continues to fall and drops below a second predetermined voltage level $V_{B(SHDN)}$ (i.e., less than the rated battery voltage and the warning level (block 315), but still sufficient to operate the controller module), a shut-down command is sent to the application module 105 (block 320). The battery voltage monitor circuit 215 continues to monitor the battery voltage $V_B$ at the battery output 245 or at the output of the voltage regulator 250 (block at 325). With power reduced or totally shut off to the application module 105, the drain on the battery is greatly reduced, and the period of time the controller module can continue to operate before the battery is refreshed is correspondingly entered. If the battery voltage $V_B$ eventually falls below a reset voltage $V_{B(RESET)}$ at the minimum level required for controller module operation (block 330), existing files buffered in the internal memory 215 of the controller module 100 are saved to memories A and B (block 335), and the controller module 100 and memories A and B are shutdown (block 340) until proper battery voltage is restored.

Instead of a total shutdown, the application and controller modules (100, 105) can be programmed to respond to their respective shutdown commands by entering a either a sleep mode to reduce functionality such as computing tasks, internal mechanical functions or displays in combination with continued monitoring of the battery voltage $V_B$ and the data bus 200, or a stepped reduction of power such as, for example, a 40% reduction then a 60% reduction. Also, if more than one application module 105 is in communication with the controller module 100, each either responds in a predetermined-shutdown sequence or as each application module receives its shutdown command.

Once the adverse power indication from the battery output 245 is removed, the controller module 100 and/or application module 105 would then return to normal operation without further prompting by the user.

Figure 4:
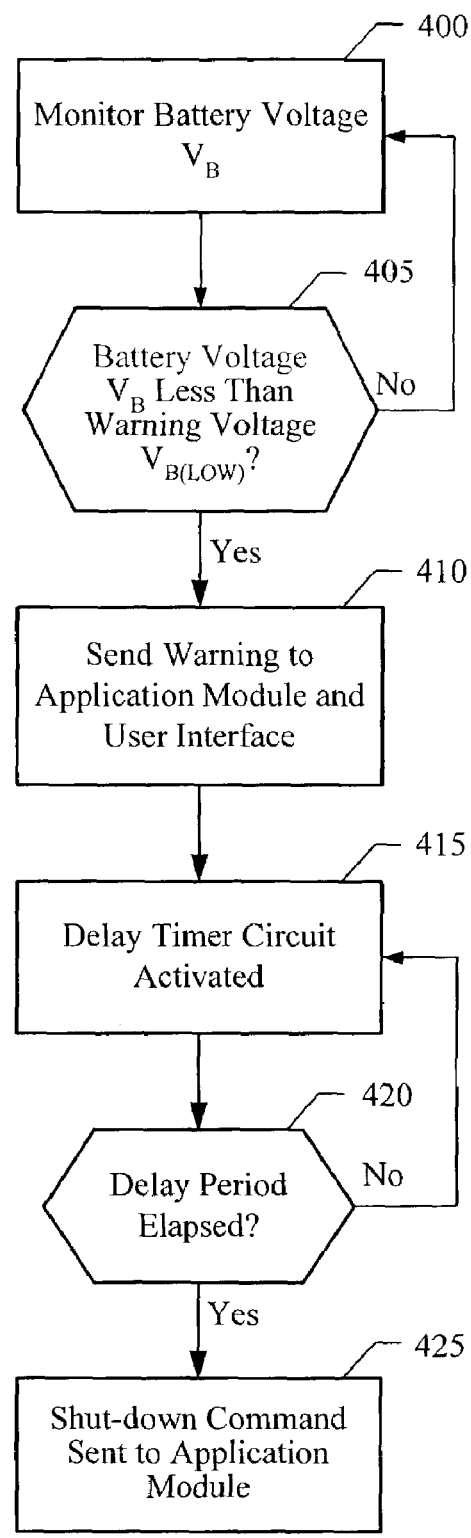
FIG. 4 is a flow diagram of another embodiment able to send a shutdown command to an application module after a time delay in response to an adverse power indication.

FIG. 4 is a flow diagram of an embodiment in which a warning is provided to the user a predetermined period of time before the application module is shut down. As in FIG. 3, the battery's voltage $V_B$ is monitored (block 400) and, if it is less than a predetermined warning voltage $V_{B(LOW)}$, an adverse power indication is registered by the processor 220 (block 405) and a warning is sent to the application module 105 from the controller module 100, (block 410). The delay timer circuit 270 is activated (block 415) and, after its delay period has elapsed (block 420), a shutdown command is sent to the application module 105 to conserve power for the controller module (block 425). A warning could also be sent to the application module and/or user interface when the delay timer circuit is activated. In this embodiment, the application module is shut down a predetermined delay period after the warning has been given, regardless of the battery voltage level at the time of shutdown. Alternately, the system could be programmed to shut down the application modules if the delay period has expired and the battery voltage has also dropped below a shutdown threshold.

Figure 5:
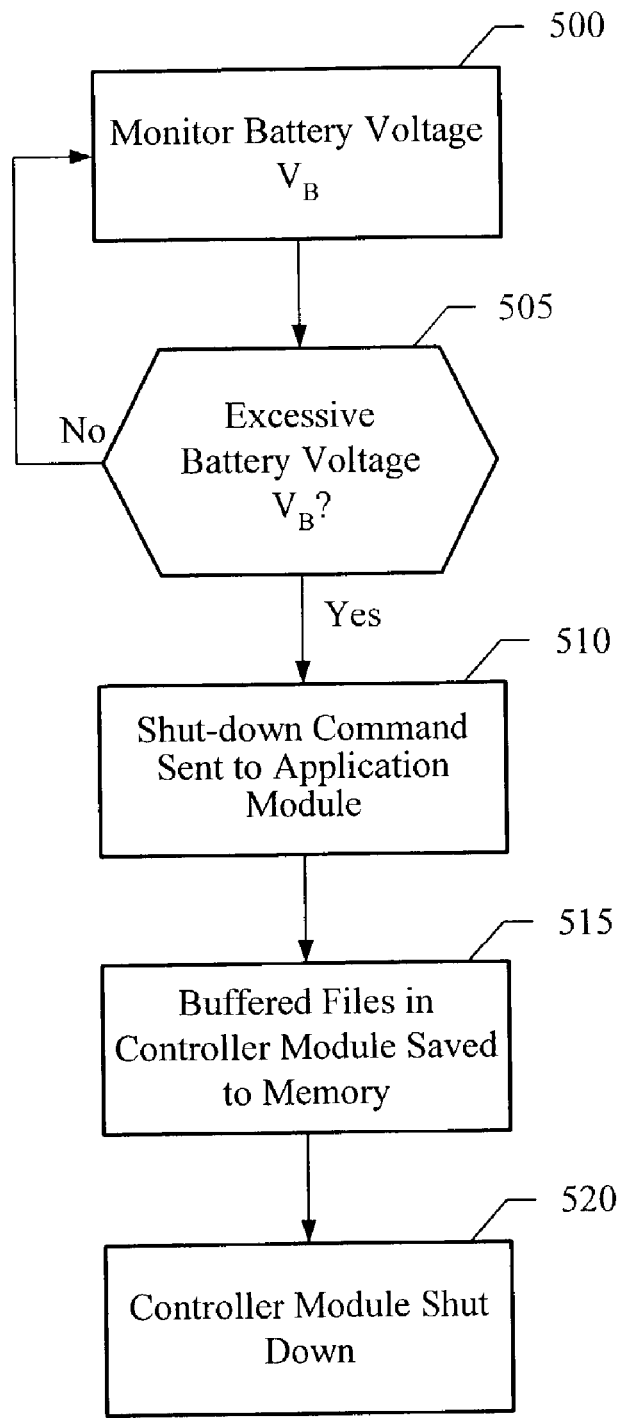
FIG. 5 is a flow diagram of an embodiment in which the application and controller modules are shut down in response to an excessive battery voltage.

FIG. 5 illustrates an embodiment of the invention that protects the controller module 100 from receiving excessive battery voltage $V_B$. The battery voltage $V_B$ is monitored (block 500) and, if it exceeds a predetermined level (block 505), an adverse power indication is registered in the processor 220. For example, failure of either the AC-DC converter 275 or regulator 250 to convert or step down their respective input voltages may result in the supply voltage to the power manager 240 rising above the predetermined voltage level. In response, a shut-down command is sent to the application module 105 (block 510) and, optionally, a warning to the user. The, files buffered in internal memory 215 are saved to memories A and B (block 515), and the controller module is also shutdown (block 520). As described above for FIG. 3, the shutdown command (block 520) may initiate a sleep-mode, rather than a complete power down of the application and controller modules (100, 105). The reduction of power to the application module occurs whenever the battery voltage moves outside of a permissible range. If the system monitors only for a low battery voltage, the upper end of the range is unlimited. If it monitors for both high and low battery voltages, the upper and lower ends of the range will both have finite limits.

We claim:

1. A power sharing method, comprising:
   supplying power from a battery in a controller module to an application module that is detachably connected to said controller module; and
   reducing the power supplied to said application module in response to an adverse power indication to conserve power for said controller module.

2. The power sharing method of claim 1, wherein said reducing comprises reducing in response to a battery voltage that is less than a predetermined threshold voltage below a rated battery voltage.

3. The power sharing method of claim 1, further comprising monitoring a regulated battery voltage to obtain said adverse power indication.

4. The power sharing method of claim 1, wherein said reducing comprises reducing in response to obtaining said power indication at an output of said battery.

5. The power sharing method of claim 1, wherein said reducing comprises sending a shutdown command to said application module to reduce said battery's load.

6. The power sharing method of claim 1, wherein said reducing comprises reducing in response to excessive current drawn by said application module.

7. The power sharing method of claim 1, wherein said reducing comprises terminating the supply of power to said application module.

8. The power sharing method of claim 1, further comprising:
   supplying power from said battery in said controller module to at least one additional application module that is in communication with said controller module.

9. The power sharing method of claim 8, further comprising:
   reducing the power to said at least one additional application module in response to an adverse power condition.

10. The power sharing method of claim 8, wherein said reducing the power supplied to said application module and at least one additional application module further comprises reducing gradually.

11. The power sharing method of claim 9, wherein said reducing the power supplied to said application module and at least one additional application module further comprises reducing in a predetermined-shutdown module sequence.

12. The power sharing method of claim 1, wherein said adverse power indication is a battery voltage that is greater than a predetermined voltage level above a rated battery voltage.

13. The power sharing method of claim 1, wherein said reducing comprises reducing functionality in said application modules.

14. The power sharing method of claim 1, comprising:
reducing the power used by said controller module by reducing its functionality.

15. A power sharing method, comprising:
supplying power from a battery in a controller module to an application module, said application module being detachably connected to said controller module; and
sending a shutdown command from said controller module to said application module if a battery voltage falls below a first predetermined voltage level.

16. The power sharing method of claim 15, further comprising monitoring the battery voltage.

17. The power sharing method of claim 16, further comprising:
sending a shutdown command to each of at least one additional application detachably connected to said controller module in response to the monitored battery voltage falling below said first predetermined level.

18. The power sharing method of claim 17, further comprising:
reducing the power to said at least one additional application module in a gradual manner in response to said at least one additional application module receiving said shutdown command.

19. The power sharing method of claim 17, further comprising:
reducing the power to said application module and said at least one additional application module in a predetermined-shutdown module sequence.

20. The power sharing method of claim 15, further comprising:
reducing power to said controller module in response to the monitored battery voltage falling below a second voltage level, that is less than said first voltage level.

21. The power sharing method of claim 20, further comprising:
sending buffered files in said controller module to a memory prior to said reduction of power to said controller module.

22. The power sharing method of claim 15, said sending further comprising sending a warning in response to the monitored battery voltage falling below said predetermined voltage level.

23. The power sharing method of claim 15, said sending further comprising sending said shutdown command upon the expiration of a delay period following a warning.

24. The power sharing method of claim 15, wherein a warning is sent to a user interface on said controller module.

25. A power sharing controller module, comprising:
a processor,
a power manager, and
at least one connector for detachably electrically connecting a first application module to said controller module, said power manager operable to manage power from a battery to said application module through said connector and to monitor the voltage of said battery, and said processor programmed to send a power reduction command to said application module in response to the monitored battery voltage moving outside of a permissible range.

26. The power-sharing controller module of claim 25, further comprising at least one additional application module detachably connected to said first application module and having a power supply from said controller module through said first application module, under the control of said power manager.

27. The power-sharing controller module of claim 25, further comprising at least one additional application module detachably connected to said controller module and having a power supply from said controller module under the control of said power manager.

28. The power-sharing controller module of claim 25, wherein said processor is programmed to send a power reduction command to all connected application modules in response to the voltage of a battery in said compartment moving outside of said permissible range.

29. The power-sharing controller module of claim 25, wherein said processor is programmed to send said power reduction command in response to the monitored battery voltage falling below a threshold level less than a rated battery voltage.

30. The power-sharing controller module of claim 29, wherein said power manager comprises a delay timer circuit that is triggered to provide a warning in response to the monitored battery voltage falling below said threshold level.

31. The power-sharing controller module of claim 29, wherein said processor, is programmed to send said power reduction command upon the expiration of a delay period following a warning.

32. The power-sharing controller module of claim 25, wherein said power reduction command further comprises a shutdown command.

33. The power-sharing controller module of claim 32, further comprising a switch controlling the supply of power from the battery to said connector, said shutdown command comprising a command to open said switch.

34. The power-sharing controller module of claim 25, further comprising a voltage regulator connected to provide a regulated battery voltage from the battery.

35. The power-sharing controller module of claim 25, wherein said power manager is connected to monitor the voltage of said battery by monitoring the regulated battery voltage.

36. The power-sharing controller module of claim 25, wherein said power manager further comprises an application module safety circuit to prevent a connected application module from drawing excessive current.

* * * * *